(12) United States Patent
Duffett-Smith et al.

(10) Patent No.: US 8,103,294 B2
(45) Date of Patent: Jan. 24, 2012

(54) DETERMINING THE CHANGE IN TIME AT A MOBILE TERMINAL

(75) Inventors: Peter James Duffett-Smith, Cambridge (GB); Robert Willem Rowe, Cambridge (GB); Murray Robert Jarvis, Cambridge (GB); Simon David Hern, Cambridge (GB); Nicolas Guy Albert Graube, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 182 days.

(21) Appl. No.: 12/312,870

(22) PCT Filed: Mar. 12, 2008

(86) PCT No.: PCT/EP2008/052966
§ 371 (c)(1),
(2), (4) Date: May 29, 2009

(87) PCT Pub. No.: WO2008/119635
PCT Pub. Date: Oct. 9, 2008

(65) Prior Publication Data
US 2010/0234048 A1    Sep. 16, 2010

(30) Foreign Application Priority Data
Mar. 29, 2007   (EP) ..................................... 07105174

(51) Int. Cl.
*H04Q 7/20* (2006.01)
(52) U.S. Cl. .................. 455/456.6; 455/67.11; 455/418; 342/357.1
(58) Field of Classification Search ............... 455/456.6, 455/418, 67.11; 342/357.1
See application file for complete search history.

(56) References Cited

U.S. PATENT DOCUMENTS

| 7,633,436 | B2 * | 12/2009 | Kangas ..................... 342/357.43 |
| 2007/0066231 | A1 * | 3/2007 | Duffett-Smith et al. ... 455/67.11 |
| 2009/0073030 | A1 * | 3/2009 | Hansen et al. ............. 342/357.1 |
| 2009/0111482 | A1 * | 4/2009 | Rowe et al. ................ 455/456.1 |

FOREIGN PATENT DOCUMENTS

| EP | 1 105 745 B1 | 9/2002 |
| WO | WO 00/73813 A1 | 12/2000 |
| WO | WO 00/73814 A1 | 12/2000 |
| WO | WO 01/73467 A2 | 10/2001 |
| WO | WO 2005/071430 A1 | 8/2005 |

* cited by examiner

*Primary Examiner* — Danh Le
(74) *Attorney, Agent, or Firm* — Roylance, Abrams, Berdo & Goodman, LLP

(57) ABSTRACT

In a terminal 106 having a receiver 202 for receiving the signals from plural transmission sources 101-105 whose positions and transmission time offsets are unknown within the terminal, a method is provided for determining the change in the time (elapsed time) at the terminal between two instants. At a first position of the terminal a first set of measurements, aligned to a first instant, of a signal parameter representative of the time or phase of receipt of said signals from said plural transmission sources relative to one or more of them, or to a reference, or to a terminal clock is obtained. Then at a second position of the terminal a corresponding second set of measurements, aligned to a second instant, of a signal parameter representative of the time or phase of receipt of said signals from said plural transmission sources relative to one or more of them, or to the reference, or to the terminal clock is also obtained. The aligned measurements of the first and second sets are combined, and the time elapsed between the first and second instants is calculated from the change in the combined aligned measurements of the first and second sets.

13 Claims, 3 Drawing Sheets

DETERMINING THE CHANGE IN TIME AT A MOBILE TERMINAL

FIELD OF THE INVENTION

The invention relates to time-keeping within a mobile terminal able to receive transmissions from transmission sources, and more particularly to the means by which the change in the time between one instant and another may be measured with higher accuracy than is available from a clock associated with the terminal.

BACKGROUND AND PRIOR ART

There are several reasons for needing accurate time information in a mobile terminal, but of particular interest here is the need to support a satellite positioning receiver. For example, in a mobile telephone of a communications system, a GPS receiver may be used to provide the position of the terminal to an emergency service, or for access to some other location-based service. The problem encountered in such circumstances is that the mobile telephone may well be inside a building or other shielded space where the satellite signals are attenuated detrimentally. The GPS receiver then usually has to perform lengthy searches involving long integration times to acquire the signals from each satellite in view, resulting in an unacceptable delay before the position becomes available or the acquisition process fails. The delay can be shortened in GPS receivers having access to accurate time and/or frequency information as the search window in time and/or frequency can then be narrowed, requiring fewer correlations and shorter searches. If the time and/or frequency information is sufficiently accurate, it may be possible to identify the offsets at which to integrate with sufficient accuracy that the GPS receiver can be run in re-acquisition mode, thereby reducing the length of time that the receiver needs to be switched on and hence reducing the drain on the terminal's computation and power resources.

One of the ways of providing the time information is to use the signals from the communications network. In WO 2005/071430, it is shown how a network using technology such as GSM or W-CDMA can be regarded as a stable, but unsynchronized, repository of time. A calibration is first performed in the mobile terminal using the GPS receiver to obtain a full position-and-time fix. The terminal also has a database of the network transmitter positions and is able to compute the times of flight from each transmitter to the terminal. Furthermore, although the network may be unsynchronised so that the transmissions have arbitrary time offsets, the terminal has access to, or is able to maintain, a list of these transmission time offsets which may, for example, be determined using the method as taught in WO 00/73813 and WO 00/73814. The calibration therefore establishes the transmission time offsets with respect to GPS time. At a later instant, for example when the terminal has moved inside a building and the GPS signals are attenuated, the GPS time may be obtained from the receipt of signals from the network transmitters together with the calibration values. This provides a robust method of providing time assistance to the GPS receiver which is maintained through periods in which the mobile terminal may be turned off and which, in a GSM system, can be accurate at the sub-microsecond level.

A problem encountered with the method taught in WO 2005/071430 is that the terminal needs to have a database of transmitter positions, and may also need to know the operational frequency plan, that is a plan of the radio-frequency channels in use by each base station together with the directional characteristics of the antennas. We have realised that in some circumstances, and with reduced accuracy, it is possible to measure the time interval between one instant and another in the terminal using the received network signals without any knowledge of where they come from, and without needing to know their transmission time offsets. Such a measured time interval is not related directly to a universal time in that no calibration step has been carried out. The interval is measured with respect to an average of the clocks controlling the network transmitters, which may be running fast or slow, and which may be independent of each other. Nevertheless, in networks controlled by sufficiently-stable oscillators (as is usually the case in practice), this 'average network time' interval may be sufficiently close to a universal time interval (such as one measured using GPS time) to be useful.

SUMMARY OF THE INVENTION

According to the invention, in a mobile terminal having a receiver for receiving the signals from plural transmission sources whose positions and transmission time offsets are unknown within the mobile terminal, there is provided a method of determining at the terminal the elapsed time between two instants, the method comprising the steps of obtaining at a first position of the mobile terminal a first set of measurements, aligned to a first instant, of a signal parameter representative of the time or phase of receipt of said signals from said plural transmission sources relative to one or more of them, or to a reference, or to a terminal clock;

obtaining at a second position of the mobile terminal a corresponding second set of measurements, aligned to a second instant, of a signal parameter representative of the time or phase of receipt of said signals from said plural transmission sources relative to one or more of them, or to the said reference, another reference, or to the terminal clock; and combining the aligned measurements of the first and second sets, and calculating at the terminal the elapsed time between the first and second instants from the change in the combined aligned measurements of the first and second sets.

The transmission sources may be any transmitters of any type set up for any purpose. These include transmitters of a communications network, including both analogue and digital networks, and including both those with public access and those limited to a private group such as a police force. Of particular relevance are the second- and third-generation public digital communications networks such as GSM, CDMA, and WCDMA. It should be noted, however, that the invention is not limited in its application to these named networks, but can be applied in any system in which the phase or time of arrival of a signal from a transmission source can be measured at a terminal. Communications networks usually operate on radio frequencies in the range 800 MHz to 3000 MHz, but the invention may be applied to any transmissions of any sort, whether electromagnetic, sound or other radiation type, at any frequency. The invention may also be applied to the use of multiple networks, in which the terminal receives signals, for example, from both GSM and W-CDMA networks at the same time, or two networks of the same type but run by different operators, in order to increase the accuracy of the determination of the change in the time.

The terminal must be equipped with a receiver able to receive the signals radiated by the transmission sources, and able to measure the phase or time of arrival time of a signal parameter. The signal parameter may be the phase of a carrier wave, or of a component modulated on it. The time of receipt may be that of a pre-defined modulation reference in the signal such as a frame boundary or a synchronisation pattern. In both cases, the measurement may be made relative to the signal produced by a local oscillator associated with the mobile terminal, or a signal derived from it (for example using a phase-locked loop or a counter). The measurement may also be made relative to one of the signals received by the mobile terminal, or to a composite reference derived from more than one of them. If the transmissions contain a regular modulated data component, such as the frame numbers in a GSM signal, the measurements may be based on the instants of arrival of those components.

Some mobile terminals, for example mobile phones, for use with a communications network contain single-channel receivers which must be switched between different receiving channels in order to measure the parameter of the signals from different transmission sources. In this case, the measurements must be made serially with respect to a reference, for example a free-running terminal clock, and then aligned to a common instant using the known terminal clock rate. In this way, the measurements may be aligned as if they had all been made at the same instant by a multi-channel receiver able to make the measurements in parallel. The error associated with the terminal clock running fast or slow is generally negligible provided that the interval over which the set of measurements is made is short enough.

A particular feature of the invention is that the positions of the transmitters need not be known, although knowledge of the positions may be used to improve the accuracy with which the change in the time at the mobile terminal can be determined. A further feature is that the network transmissions themselves need not be synchronised with each other, that is a particular phase or modulation feature is transmitted with an unknown offset with respect to any time base. Furthermore, their transmission time offsets need not be known. This means that the invention may be applied to any network type, synchronised or not, such as CDMA (synchronised), GSM and W-CDMA (unsynchronised).

The elapsed time is measured between two terminal instants, that is between the mobile terminal being at a first position at a first instant, and the mobile terminal being at a second position at a second instant. The first and second positions can, in some circumstances, be the same position, but the first and second instants must be different, since the point of the invention is to measure the time difference or elapsed time between the first instant and the second instant. Measurements made at third, fourth, fifth etc. positions at third, fourth, fifth instants may also be used to determine further parameters of a terminal clock model. For example, if measurements are referred to a terminal clock driven by an oscillator associated with the mobile terminal and hence aligned with first, second, and third instants, both the rate of change and second rate of change of the offset of the terminal clock may be determined relative to the network transmissions, as well as the change in the offset (bias). In this way, it is possible to characterise the variations in the terminal clock, which may be poorly regulated by an inexpensive crystal oscillator, with respect to the stability characteristics of the network transmitters, which may individually be governed by high-stability quartz clocks or atomic frequency standards and with whole sections of the network regulated by a single high-specification time standard.

The change in the time between first and second mobile terminal positions may therefore be obtained directly from the indication given by the terminal clock once it has been characterised with respect the network transmissions as just described. If other parameters, such as the rate of change of the clock bias (offset) have been measured, it may also be possible to provide accurate estimates of other parameters, such as the frequency offset of the mobile terminal's oscillator. This might be useful, for example, in the case where the mobile terminal contains satellite positioning apparatus. One of the problems associated with the use of satellite positioning in mobile terminals is that the mobile terminals are often used inside buildings and other shielded environments where the signals are very weak. The satellite receiver may then need assistance in the form of accurate time and frequency information, and this may be provided using the present invention. For example, if the satellite receiver obtained a position and time solution in the past, and the method of the invention was used to determine the time interval between then and the present time, the satellite receiver (which may have been switched off in the interim) could be provided with an accurate estimate of the satellite time, thereby enabling it to narrow its search windows and obtain a satellite positioning solution more quickly.

The step of combining the measurements may, for example, include averaging all the measurements in each set, or averaging differences between the corresponding measurements of the times of receipt of signals from each transmission source in the two measurement sets. The averaging process may be arithmetic or geometric averaging, or one based on a different statistic of the measurements such as the median or an inner percentile. The individual differences of corresponding measurements in each set may also be used to infer the physical arrangement of the transmission sources relative to the direction of motion of the mobile terminal, so as to allow the estimation and removal of some geometrically-dependent errors. Further measurement sets made at third, fourth, fifth etc. positions may be needed to estimate higher-order effects.

The invention includes a mobile terminal of a position measuring system, the mobile terminal having a receiver for receiving the signals from plural transmission sources whose positions and transmission time offsets are unknown within the mobile terminal, the mobile terminal further comprising means for obtaining sets of measurements of representations of times or phases of receipt of said signals from said plural transmission sources relative to one or more of them, or to a reference, or to a terminal clock at plural instants and aligning them with respective instants; and means arranged to combine the measurements of the individual sets, and to calculate at the mobile terminal the elapsed time between the first and second instants from the combined aligned measurements of the sets.

BRIEF DESCRIPTION OF THE DRAWINGS

One example of a method according to the invention and examples of the system in which it may be deployed will now be further described with reference to the accompanying drawings, in which.

DETAILED DESCRIPTION OF THE EXAMPLES

Figure 1:
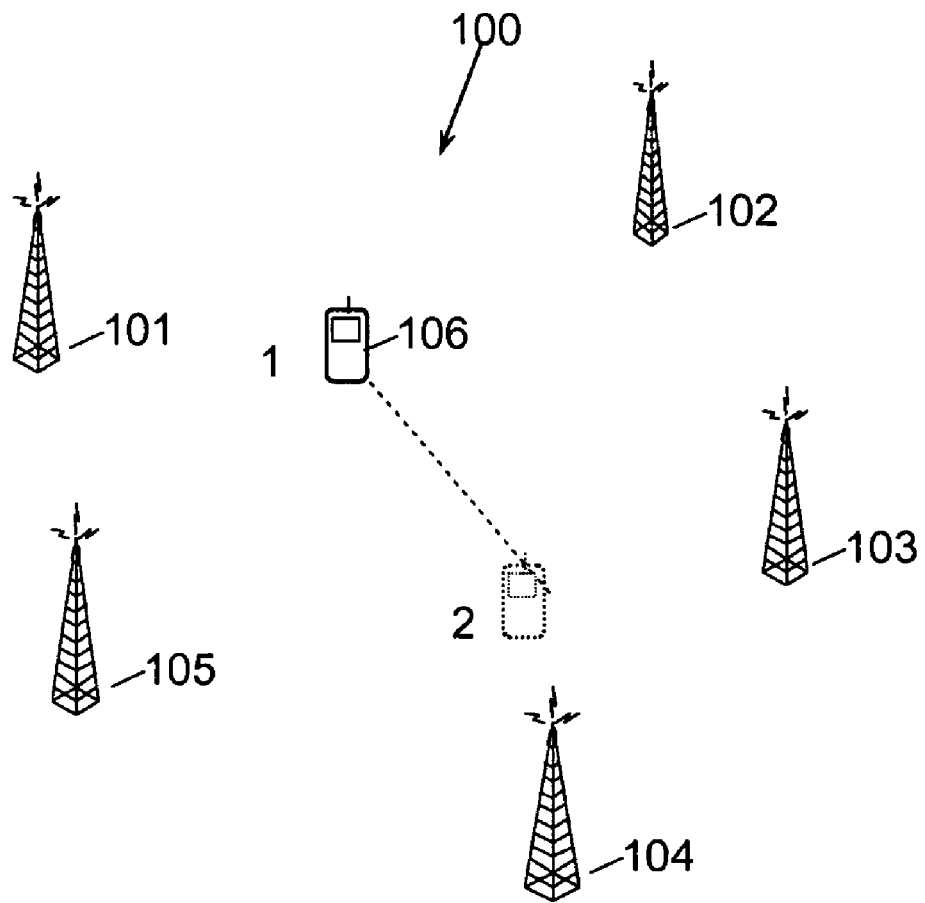
FIG. 1 illustrates a communications system having base transceiver stations, and a mobile terminal of the communications network.

FIG. 1 shows an example of a communications system embodying the invention. A mobile GSM terminal 106 receives the signals broadcast by the base transceiver stations (BTS) 101-105 of a communications network 100, in this case a GSM network. It should be noted that it is standard for all the BTSs to transmit a synchronisation burst of known format every 50 ms or so. In normal operation, any terminal within the network, such as the mobile terminal 106, uses these bursts to align its internal clock with the signal received from the serving BTS, and to determine the approximate offsets of the signals from the neighbouring BTSs (which are unsynchronised in a GSM network), as part of the processes which are used in the communications within the network. In the present embodiment of the invention, the synchronisation bursts are also used as the indicators of the times of receipt of the signals from each BTS.

Figure 2:
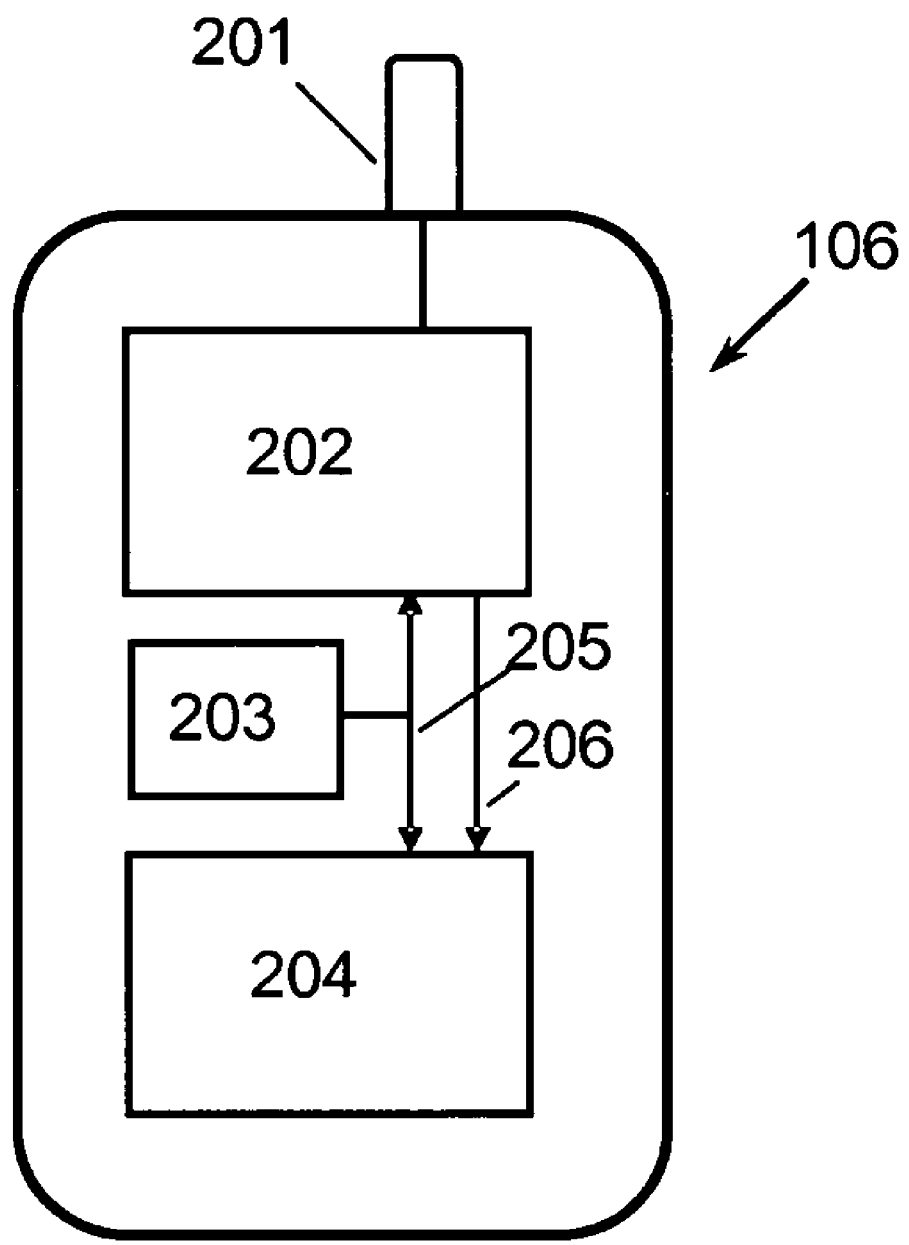
FIG. 2 shows a mobile terminal embodying the invention.

FIG. 2 shows the principle components of mobile terminal 106. BTS signals are received by an antenna 201 and passed to a communications receiver 202 which contains the components usually found within such a receiver (these are not shown in FIG. 2). Base-band in-phase and quadrature (I and Q) digital samples are passed via a link 206 to a processor module 204. The timings of the I and Q samples are related to a terminal clock module 203 which is connected via a link 205 to both the communications receiver 202 and the processor module 204. In the processor 204 I and Q samples corresponding to a synchronisation burst are cross-correlated with a template, and an interpolation is performed to find the time offset of the peak of the cross-correlation with respect to the terminal clock.

A set of measurements is made on the signals from the serving and neighbouring BTSs as follows. The receiver 202 is tuned to the first BTS in a list of receivable BTSs, and then to each of the other BTSs in turn and in each case the cross-correlation and interpolation is carried out and the values saved in processor memory. At the end of the sequence, the timing corresponding to one of them may be subtracted from that of each of the neighbour BTSs to obtain a set of times of receipt relative to the arrival of the signals from the first BTS. Alternatively, the subtraction step is omitted, in which case the measurements in the set are all relative to the terminal clock. The timings themselves may be expressed in terms of received frame numbers.

The essence of the invention can be understood by considering the mathematical description in terms of frame numbers which now follows. (A frame number is a number associated with each section, or frame, of data transmitted by a GSM BTS. Frame numbers start from zero and increment uniformly at a constant rate, reaching a maximum count and then resetting to zero every few hours.) The universal time, for example GPS time, is represented by $\tau$. The value of $\tau$ is simultaneously the same everywhere, and it is assumed to increase at a uniform rate. Consider first the signals from a single BTS, labelled A. At a first instant, $\tau_1$ (at terminal position 1), the mobile terminal receives frame number $F_{A1}$ from BTS A. The frame numbers transmitted by the BTS increase at a uniform rate given by $$\dot{F}_A = \frac{dF_A}{d\tau}. \tag{1}$$

(It is assumed that the frame numbers have been corrected for the periodical resets.) At any subsequent instant $\tau$, provided that the mobile terminal stays in the same place, the frame number $F_{A2}$ received by the mobile terminal denotes universal time using $$\tau = \tau_1 + \frac{F_{A2} - F_{A1}}{\dot{F}_A}. \tag{2}$$

Thus, time in the mobile terminal can be known from the receipt of frame numbers from BTS A whilst it stays at the same terminal position. The value of $\dot{F}_A$ represents the equivalent rate of change of $F_A$ between the two instants 1 and 2, no matter how it may actually have varied.

Frame number $F_{A1}$ was actually transmitted at universal time $$\tau_1 - \frac{d_{A1}}{\upsilon},$$

where $d_{A1}$ is the distance between the terminal position 1 and BTS A, and $\upsilon$ is the propagation speed of the radio waves. Suppose now that the mobile terminal moves to a different position (terminal position 2), a distance $d_{A2}$ from BTS A. At instant $\tau_2$, frame number $F_{A2}$ is received. This took a time $$\frac{d_{A2}}{\upsilon}$$

to travel from the BTS to the mobile terminal. The interval between the time of arrival of frame number $F_{A1}$ and frame number $F_{A2}$ at the mobile terminal 106 is therefore given by $$\tau_2 - \tau_1 = \frac{F_{A2} - F_{A1}}{\dot{F}_A} + \frac{d_{A2}}{\upsilon} - \frac{d_{A1}}{\upsilon}. \tag{3}$$

Equation (3) shows how the universal time interval between instants 1 and 2 can be deduced from the receipt of frame numbers $F_{A1}$ and $F_{A2}$ provided that $d_{A1}$, $d_{A2}$ and $\dot{F}_A$ are known. Note that, in practice, the BTSs are controlled by high-quality oscillators which may in turn be trained from a central source, so the frame-number rate can be established within tight bounds.

The above analysis may be extended to include the signals from more than one BTS 101-105. In practice, in an unsynchronised system such as GSM, the transmissions are unsynchronised, and there is an unknown transmission time offset, $\alpha$, associated with each BTS. The value of $\alpha$ is expressed in equivalent meters of distance with respect to an arbitrary origin.

A set of measurements of the frame numbers received from several BTSs by mobile terminal 106 is obtained at each of two terminal positions and instants, 1 and 2 (see FIG. 1). In a simple implementation of the invention, the measurements in each set are averaged to obtain a single average frame number $\bar{F}$. Suppose that the frame number received by the mobile terminal 106 from the $k^{th}$ of N BTSs, where k=1 ... N, at terminal position i, where i=1 ... 2, is $F_{ki}$. Then the average frame number of the measurement set is given by $$\bar{F}_i = \frac{1}{N} \sum_{k=1}^{N} F_{ki}. \tag{4}$$

If the position vector of the $k^{th}$ BTS is $b_k$ relative to an arbitrary origin, and if the $i^{th}$ terminal position is $r_i$ relative to the same origin, equation (3) may be expressed as $$\tau_2 - \tau_1 = \frac{1}{N} \sum_{k=1}^{N} \left( \begin{array}{c} \frac{F_{k2} - F_{k1}}{\dot{F}_k} + \frac{|r_2 - b_k|}{v} + \\ \alpha_k - \frac{|r_1 - b_k|}{v} - \alpha_k \end{array} \right). \quad (5)$$

or $$\tau_2 - \tau_1 \cong \frac{\overline{F}_2 - \overline{F}_1}{\dot{F}} + \frac{1}{N} \sum_{k=1}^{N} \left( \frac{|r_2 - b_k|}{v} - \frac{|r_1 - b_k|}{v} \right).$$

The vertical bars denote the modulus of the enclosed vector, and $\dot{F}$ represents the average rate of increase of frame numbers, that is $$\dot{F} = \frac{1}{N} \sum_{k=1}^{N} \dot{F}_k.$$

Setting the vector origin at terminal position 1 gives $$\tau_2 - \tau_1 \cong \frac{\overline{F}_2 - \overline{F}_1}{\dot{F}} + \frac{1}{N} \sum_{k=1}^{N} \left( \frac{|s - b_k|}{v} - \frac{b_k}{v} \right), \quad (6)$$

where s is the position vector representing terminal position 2 with respect to terminal position 1.

Equation (6) shows the relationship between what is measured, $\overline{F}_2 - \overline{F}_1$, and the true time interval, $\tau_2 - \tau_1$. If the BTS oscillators were all perfect and on their nominal frequencies, and if the mobile terminal stayed at the same position, the universal time interval between instant 1 and instant 2 would be deduced without error from the averages of the frame numbers. A more realistic case is to suppose that the distance, s, between the two terminal positions is small compared with the distances to the BTSs. If $\theta_k$ is the angle between the vectors s and $b_k$, that is $$\cos \theta_k = \frac{s \cdot b}{|s||b|}, \quad (7)$$

then the summation term of equation (6) reduces approximately to $$\frac{1}{N} \sum_{k=1}^{N} \left( \frac{|s - b_k|}{v} - \frac{b_k}{v} \right) \simeq \frac{s}{v} \left( \frac{s}{2\overline{b}} - \frac{1}{N} \sum_{k=1}^{N} \cos \theta_k \right) \approx \frac{s^2}{2v\overline{b}} \quad (8)$$

on the assumption that the BTSs surround the terminal positions sufficiently well that the average of $\cos \theta_k$ is approximately zero, and where $\overline{b}$ is the average (large) distance from the first terminal position to the BTSs.

Substituting equation (8) into equation (6) gives $$\tau_2 - \tau_1 \simeq \frac{\overline{F}_2 - \overline{F}_1}{\dot{F}} + \frac{s^2}{2v\overline{b}} \approx \frac{\overline{F}_2 - \overline{F}_1}{\dot{F}}, \quad (9)$$

if $\overline{b}$ is sufficiently large compared with s.

Equation (9) shows that the difference between the averages of the frame numbers approximates to the universal time interval between the instants at which the measurement sets were taken.

The terminal clock model can be estimated from measurements made at two or more positions. On the assumption that the terminal clock bias rate is constant, for example, the terminal clock time can be written as $$\epsilon_i = \epsilon_0 + \dot{\epsilon} \tau_i, \quad (10)$$

where $\epsilon_0$ is a constant offset and $\dot{\epsilon}$ is a constant bias rate. Substituting for $\tau$ using equation 9 gives $$\dot{\epsilon} = \frac{\epsilon_2 - \epsilon_1}{\tau_2 - \tau_1} \approx \frac{\epsilon_2 - \epsilon_1}{\overline{F}_2 - \overline{F}_1} \dot{F}. \quad (11)$$

Hence, the terminal clock bias rate may be estimated from the averages of the frame numbers received at two instants at which the terminal clock readings are $\epsilon_1$ and $\epsilon_2$. The bias rate is directly related to the mobile terminal's oscillator frequency. If the same oscillator is used for GPS, the clock bias rate estimate provides for frequency assistance to the GPS receiver.

Figure 3:
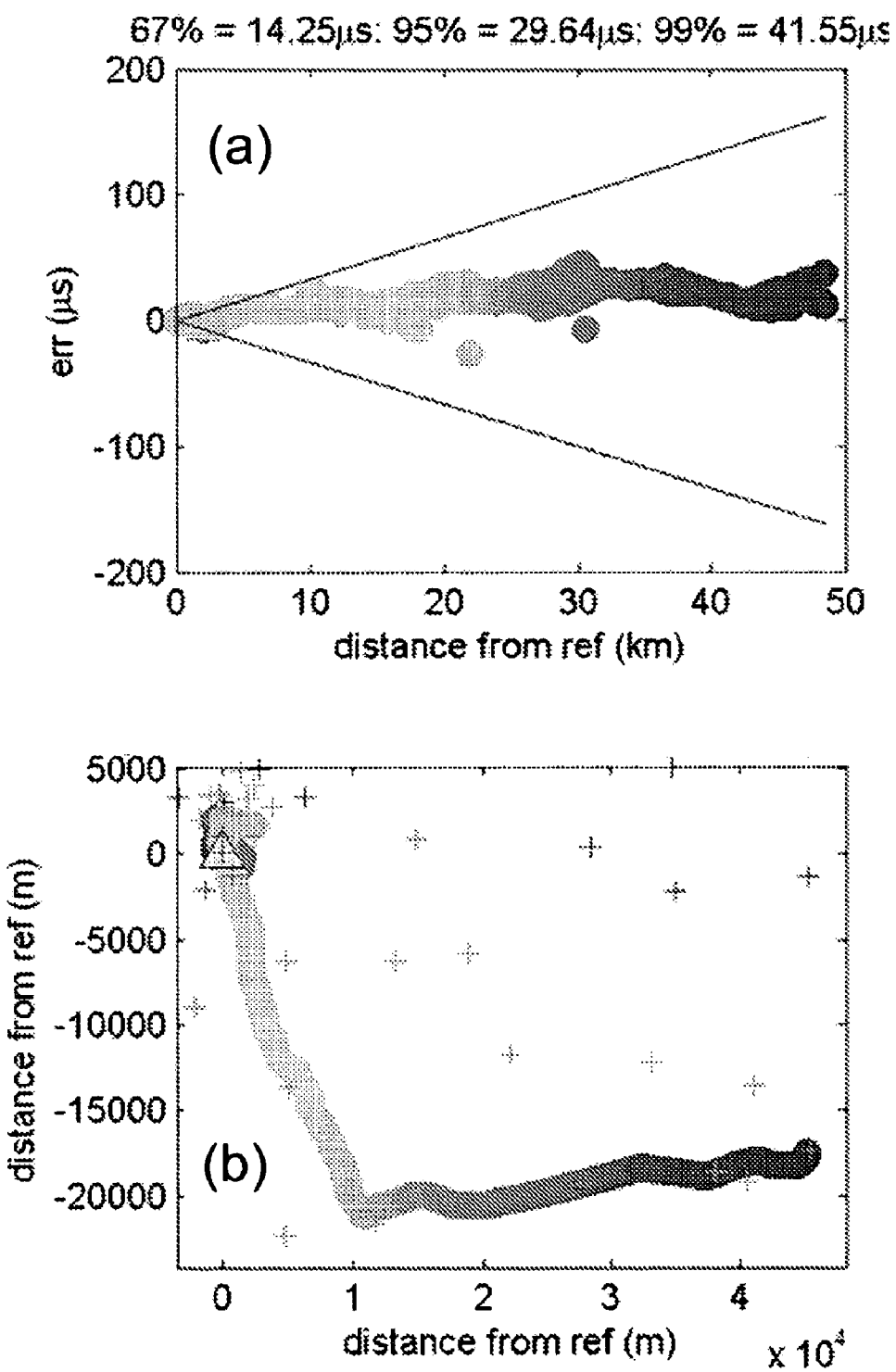
FIG. 3 illustrates an application of the invention.

The utility of the invention was tested using measurements gathered in a road test of a commercial GSM network. The route taken by the test vehicle is shown in FIG. 3(b). The test started in the top left-hand corner of the map, and then proceeded along the indicated route to the end point on the bottom right-hand corner of the map. At regular intervals along the route, the identities and positions of the BTSs that could be received were recorded. The method outlined above was then simulated by making the assumption that at each test point the times of receipt of the signals from the detected BTSs could have been measured. The error on the time deduced using the method of the invention and true time was calculated for each pair of test points and is plotted in FIG. 3(a). For comparison, the diverging solid lines indicate the error associated with the time of flight relative to the start, that is 1 μs per 300 m of distance. The assumptions made in the derivation of equation 9 introduce less than 15 μs (one standard deviation) in a journey exceeding 50 km in length.

The invention claimed is:

1. A method of determining at a mobile terminal the elapsed time between two terminal positions and instants, the mobile terminal having a receiver for receiving the signals from plural transmission sources whose positions and transmission time offsets are unknown within the mobile terminal, the method comprising the steps of obtaining at a first position of the mobile terminal a first set of measurements, aligned to a first instant, of a signal parameter representative of the time or phase of receipt of said signals from said plural transmission sources relative to one of them, or to a reference, or to a mobile terminal clock;

obtaining at a second position of the mobile terminal a corresponding second set of measurements, aligned to a second instant, of a signal parameter representative of the time or phase of receipt of said signals from said plural transmission sources relative to one or more of them, or to the said reference, another reference, or to the mobile terminal clock; and combining the aligned measurements of the first and second sets, and calculating at the terminal the elapsed time between the first and second instants from the combined aligned measurements of the first and second sets.

2. The method according to claim 1, wherein the mobile terminal contains a single channel receiver and the measurements are made serially with respect to a free-running terminal clock and then aligned to a common instant using the known mobile terminal clock rate.

3. The method according to claim 1, wherein the mobile terminal contains a multi-channel receiver and the measurements are made in parallel and hence automatically aligned the same instant.

4. The method according to claim 1, wherein further sets of measurements of a parameter representative of the time or phase of receipt of said signals from said plural transmission sources relative to one or more of them, or to a reference, or to a mobile terminal clock are also made.

5. The method according to claim 1, wherein measurements are made relative to a terminal clock driven by an oscillator associated with the mobile terminal and aligned with first, second, and third instants, whereby both the rate of change and second rate of change of the offset of the terminal clock are determined relative to the network transmissions.

6. The method according to claim 1, wherein the transmission sources are base station transmitters in a cellular wireless communication system.

7. The method according to claim 6, wherein the sets of measurements comprise transmission signal frame numbers.

8. The method according to claim 7, wherein the averages of the frame numbers received at the first and second instants and the average rate of increase of frame numbers are determined, and the universal time interval is calculated as the difference between the averages of the frame numbers received at the first and second instants divided by the average rate of increase of the frame numbers.

9. The method according to claim 1, wherein the sets of measurements comprise transmission signal frame boundaries.

10. The method according to claim 1, wherein the sets of measurements comprise transmission signal synchronisation patterns.

11. The method according to claim 1, wherein combining comprises averaging all the measurements in each of the first and second sets of measurements and calculating the difference between the averages, or calculating the differences between the corresponding measurements of the times or phases of receipt of signals from each transmission source in the first and second sets of measurements and averaging the differences, and using the calculated difference or the averaged differences to estimate the elapsed time between the first and second instants.

12. A mobile terminal of a position measuring system, the terminal having a receiver for receiving the signals from plural transmission sources whose positions and transmission time offsets are unknown within the mobile terminal, the terminal further comprising means for obtaining sets of measurements of representations of times or phases of receipt of said signals from said plural transmission sources relative to one of them, or to a reference, or to a mobile terminal clock at plural instants and aligning them with respective instants;

means arranged to combine the measurements of the individual sets, and to calculate at the terminal the elapsed time between a first and a second one of the plural instants from the combined aligned measurements of the sets; and a satellite positioning module;

wherein the elapsed time between the first and second instants is passed to the satellite positioning module.

13. The terminal according to claim 12, wherein means arranged to combine the measurements of the individual sets comprises at least one of a programmed processing device and a non-transitory storage device having program code stored thereon that is configured to average all the measurements in each of the first and second sets of measurements and calculating the difference between the averages, or calculate the differences between the corresponding measurements of the times or phases of receipt of signals from each transmission source in the first and second sets of measurements and averaging the differences, and calculate an estimate of the elapsed time from the calculated difference or the averaged differences.

* * * * *